United States Patent [19]

Krekeler

[11] 4,175,797

[45] Nov. 27, 1979

[54] GROUND ENGAGING TREAD OR TRACK COMPRISED OF IMPROVED ARTICULATED CRAWLER PADS, FOR TREADED VEHICLES SUCH AS MINING MACHINES AND THE LIKE

[75] Inventor: Claude B. Krekeler, Cincinnati, Ohio

[73] Assignee: The Cincinnati Mine Machinery Company, Cincinnati, Ohio

[21] Appl. No.: 841,573

[22] Filed: Oct. 12, 1977

[51] Int. Cl.² .............................................. B62D 55/20
[52] U.S. Cl. ....................................... 305/53; 305/57; 305/58 R
[58] Field of Search ......................... 305/58 R, 57, 53

[56] References Cited

U.S. PATENT DOCUMENTS

| | | | |
|---|---|---|---|
| 1,513,459 | 10/1924 | Jett | 305/58 X |
| 1,973,214 | 9/1934 | Lamb | 305/57 X |
| 2,167,039 | 7/1939 | Ekbom | 305/53 X |
| 2,332,715 | 10/1943 | Herrington | 305/58 X |
| 2,392,383 | 1/1946 | Hollenkamp | 305/57 |
| 3,128,130 | 4/1964 | Harris | 305/53 |
| 3,721,476 | 3/1973 | Andersson | 305/58 X |

Primary Examiner—Robert J. Spar
Assistant Examiner—John P. Shannon
Attorney, Agent, or Firm—Frost & Jacobs

[57] ABSTRACT

An endless self-laying tread or track such as used on self-propelled mining machines and the like, the tread or track being comprised of a plurality of articulated crawler pads configured so as not only to effect good ground engagement but also to assist in preventing the tread or track from becoming clogged. A plurality of the crawler pads are arranged in interdigitated relationship and connected by elongated pins. As so connected open ended spaces are provided at either side of the tread for engagement by the teeth of a driving sprocket. By this arrangement such teeth may be wider and thicker. The space occupied by such a sprocket tooth, being open ended, greatly facilitates the dispersement of any accumulated packing between the tooth and the crawler pads in a sideways direction. One or more pins or pintles are used to connect each adjacent pair of interdigitated pads. The ends of the interdigitated portions of the individual crawler pads may be squared off so as to positively engage, and then push therefrom, the surface material on which the tread runs. By arranging the tread so that it may be drivingly engaged by sprocket teeth operating at the open ends of the crawler pads, the interior spaces usually required to receive the sprocket teeth are no longer needed and a single, larger diameter pintle can be used while at the same time providing additional crawler pad bulk about the pintle whereby to beef-up the entire tread structure. The crawler pads may utilize improved grousers or ground penetrating ribs.

5 Claims, 15 Drawing Figures

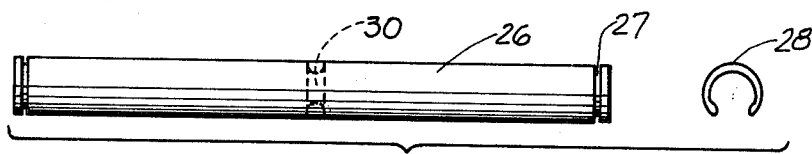
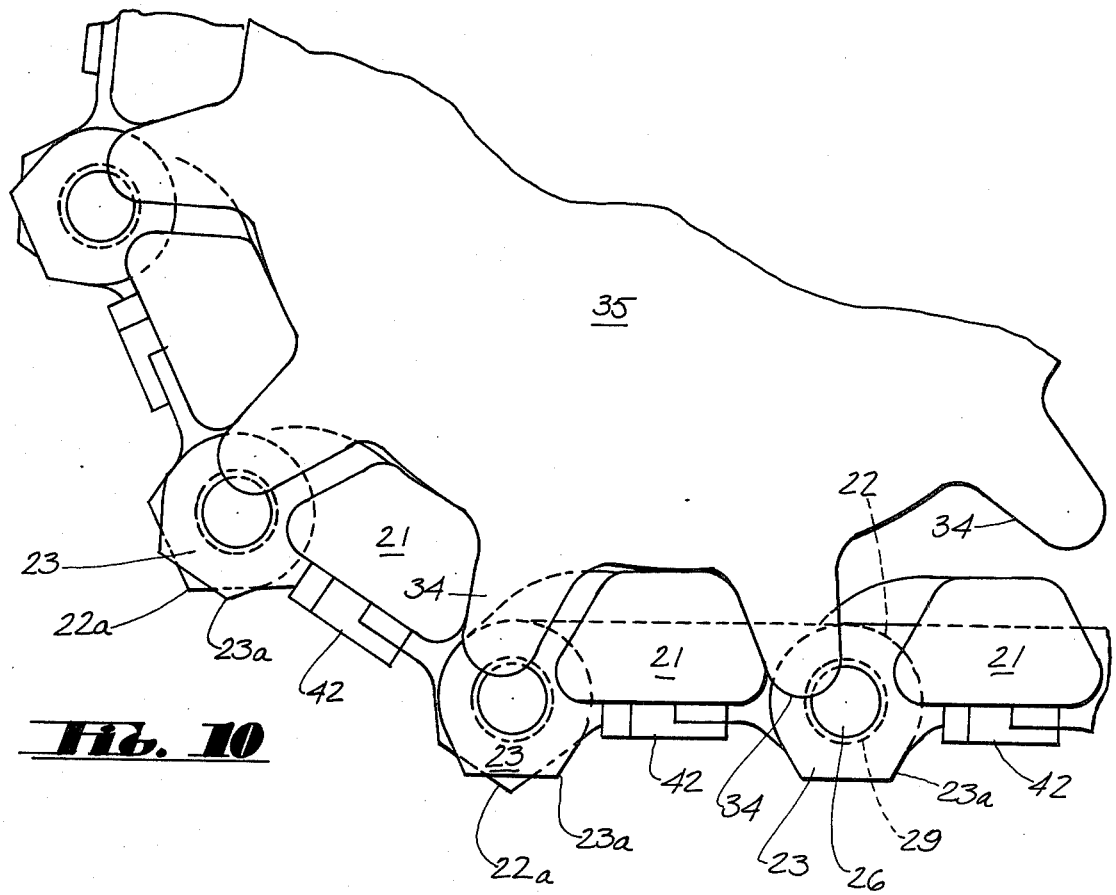
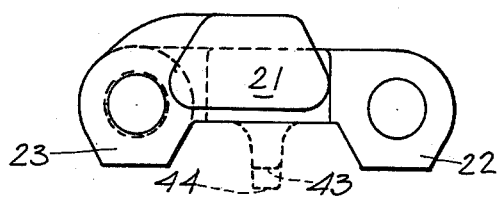
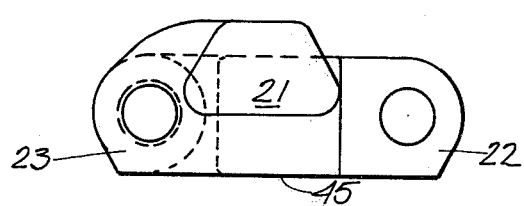
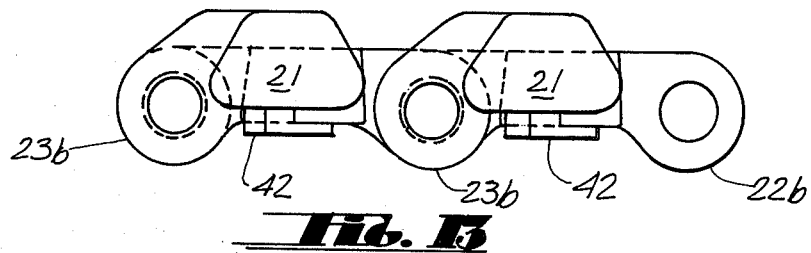

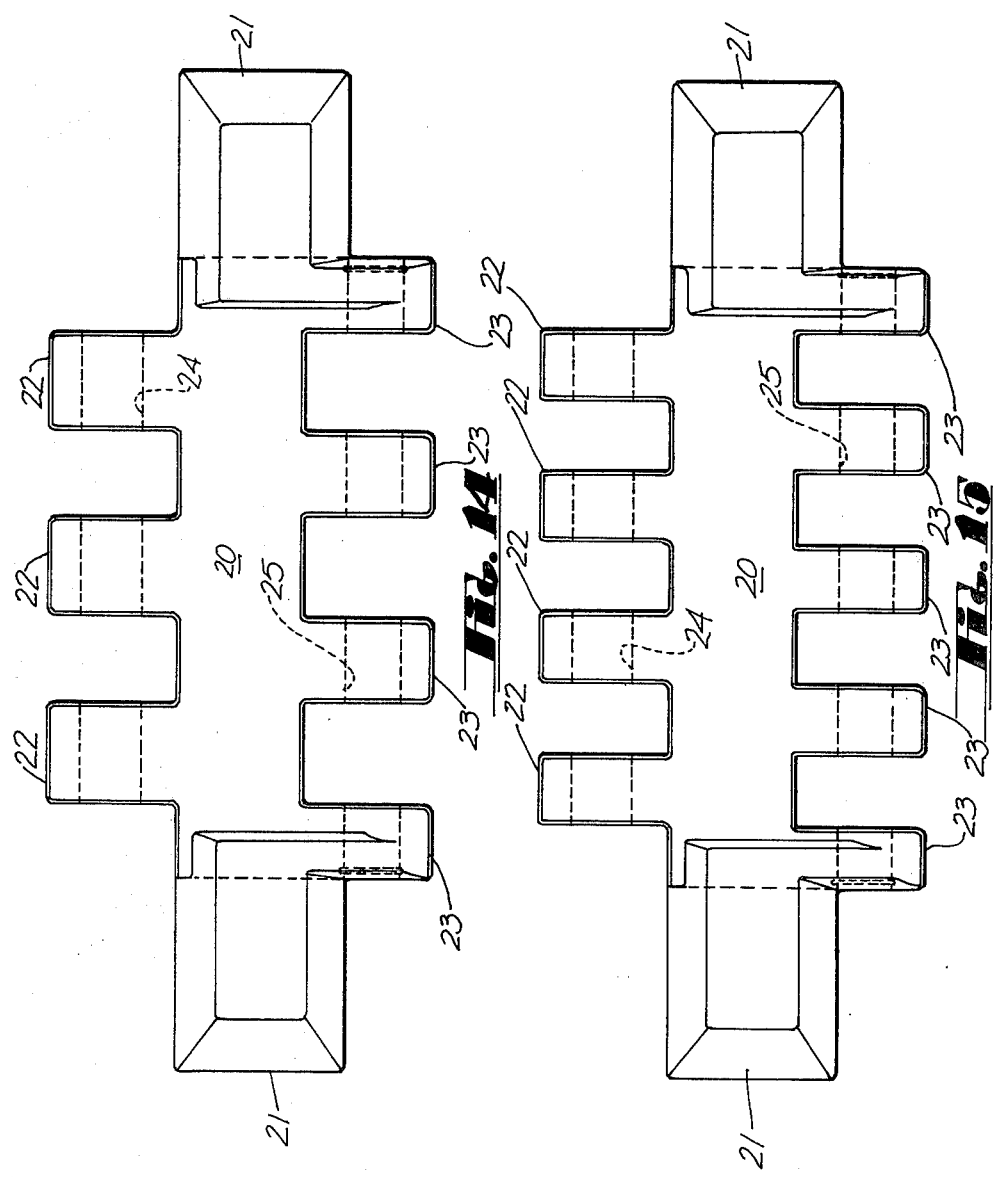

GROUND ENGAGING TREAD OR TRACK
COMPRISED OF IMPROVED ARTICULATED
CRAWLER PADS, FOR TREADED VEHICLES
SUCH AS MINING MACHINES AND THE LIKE

BACKGROUND OF THE INVENTION

1. Field of the Invention

The improved ground engaging crawler tread or track of this invention, comprised of improved articulated crawler pads, is particularly well suited for treaded vehicles such as mining machines and the like. While the invention is directed to endless self-laying treads or tracks such as used on self-propelled mining machines, they may also be considered as all-purpose endless treads or tracks for treaded vehicles generally, including earth working machines and the like, as well as tractors and the like.

2. Description of the Prior Art

A rather preliminary patentability search of the prior United States patent art was conducted in an effort to locate the more pertinent of such art. No assertion is made, however, that the most pertinent art was indeed found. That search did locate the following U.S. Pat. Nos. FULLER 1,330,253; LEYNER 1,473,569; KNOX 1,924,161; LAMB 2,115,994; BALL 2,483,961; COMELLAS 3,539,230; COMMELLAS 3,649,085; TURKIEWICA 3,929,385; BECKER 3,937,529; STURGES 3,937,530; NELSON 3,947,074; and MASSIEON, ET AL. 3,955,855; attention is also called to KREKELER 3,788,711. These patents show various items described as traction belts, an endless traction track utilizing a grouser or ground penetrating rib, a flexible track, treads or tracks, endless self-laying tracks such as used on tractors and self-propelled mining machinery, a track for a track vehicle having a series of articulated ground engaging elements, a plurality of articulated track shoes, an endless track assembly, a track made up of links, and a continuous chain for use as a tread of a self-propelled mining machine.

A typical prior art crawler chain for use on a drum type continuous miner employs a plurality of crawler pads so configured that any two adjacent pads are joined by a plurality of pins located near the lateral ends thereof, and each pad is provided with a plurality of internal openings to receive the teeth of a driving sprocket. The requirement of the use of a plurality of pins to join a single pair of pads makes for a complicated structure. The requirement of internal sprocket teeth receiving openings increases the probability of clogging and reduces the amount of pad bulk which could otherwise be utilized to strengthen the areas in which the connecting pins are located.

SUMMARY OF THE INVENTION

The improved ground engaging tread or track comprised of improved articulated crawler pads, for treaded vehicles such as mining machines and the like, utilizes pads which are open ended laterally of the tread made up therefrom, the spaces provided at these open ends being those which are occupied by the sprocket teeth. This greatly facilitates the dispersement of any foreign material which might otherwise accumulate in these spaces in a sideways direction.

The crawler pads are arranged so that a single pintle or connecting pin may join any adjacent pairs of the articulated pads. By substituting the open end arrangement for the interior sprocket teeth openings required by the prior art, additional pad material is available in the vicinity of those portions thereof which receive the pintles. The pintles, therefore, can be of greater diameter than heretofore possible while at the same time more pad bulk is available in those areas of the crawler pad wherein the pintle receiving holes are located.

The squared off, ground engaging portions of the individual crawler pads not only provide positive engagement with the surface on which the tread rides, but such squared off portions greatly assist in shoving chunks of ground material clear of the tread as it proceeds around the driving sprockets.

Considering the pitch of the sprocket and tread as being the distance between adjacent connecting pintles for the articulated crawler pads, the pitch for a sprocket and tread of this invention is greater than that of comparable prior art arrangements whereby fewer crawler pads are required to make-up a comparable tread, while at the same time the individual crawler pads are such that the treads made up therefrom may pass through the same openings provided in the driving machinery for the comparable prior art treads or tracks.

BRIEF DESCRIPTION OF THE DRAWINGS

FIG. 9 is a perspective view of a connecting pin or pintle and retaining means therefor.

FIG. 10 is a partial end view of a portion of the crawler tread comprised of a plurality of the crawler pads with the sprocket shown as engaged with such tread.

FIG. 11 is an end view of a modified crawler pad of this invention.

FIG. 12 is an end view of a further modified crawler pad of this invention.

FIG. 13 is an end view, similar to that of FIG. 5, of a pair of modified crawler pads in their interdigitated relationship.

FIGS. 14 and 15 are top views similar to FIG. 2 but showing those crawler pad embodiments which employ three and four, and four and five, respectively, main grouser elements 22 and 23.

DESCRIPTION OF THE PREFERRED EMBODIMENTS

Figure 1:
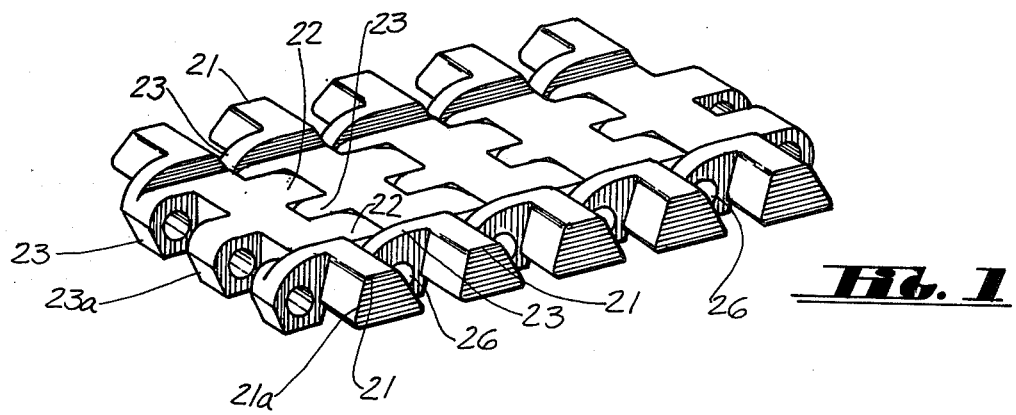
FIG. 1 is a perspective view showing a plurality of crawler pads in interdigitated relationship, such view illustrating only a portion of the crawler tread, track or chain to be made up from these crawler pads.
Figure 2:
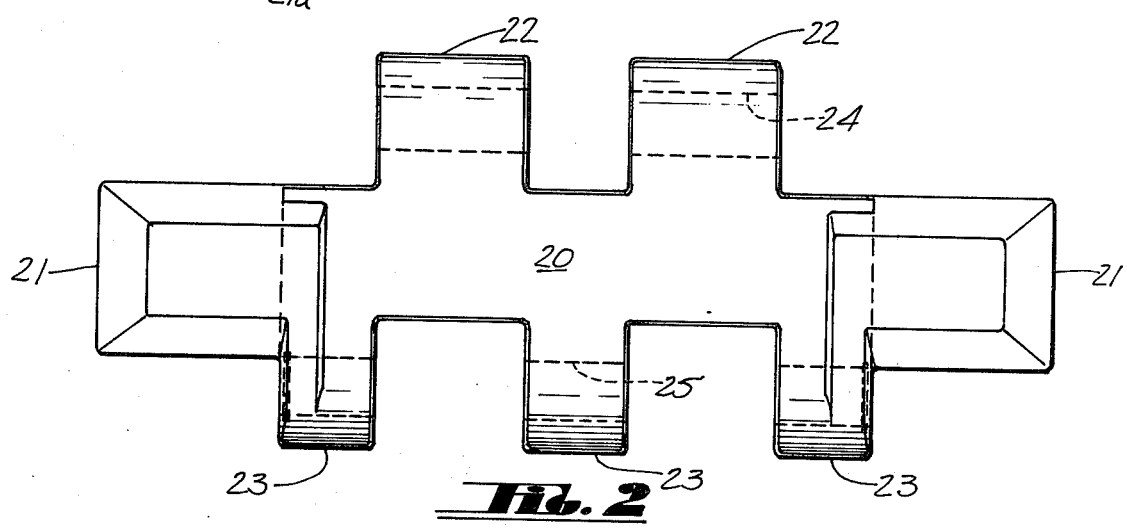
FIG. 2 is a top view of one of the crawler pads of this invention.

A preferred form of crawler pad 20 is depicted in FIGS. 2 through 5. The crawler pad has a center portion extending from one end 21 thereof to an opposite end 21. This center portion is uninterrupted by any orifices and the like for the reception of the teeth on a driving sprocket. The length of the pad 20 from one end 21 to the other determines the width of the tread to be made up from a plurality of the crawler pads 20 when properly joined in their interdigitated relationship. Extending outwardly from the uninterrupted center portion of the pad 20 are a plurality of main grouser elements 22 and 23. The crawler pad 20 is illustrated as having two of the main grouser elements 22 and three of the main grouser elements 23. The grouser elements 23 are spaced so as to just nicely receive the grouser elements 22 when a plurality of pads are placed in their interdigitated relationship. Pintle receiving bores 24 and 25 are provided in the grouser elements 22 and 23 respectively. The bores 24 and 25 are so located in their respective grouser elements that when the elements 22 of one pad 20 are interdigitated among the elements 23 of an adjacent pad 20, a single pintle, such as that illustrated in FIG. 9, may be passed through the aligned bores 24 and 25 to secure that pair of pads 20 in articulated relationship.

Figure 7:
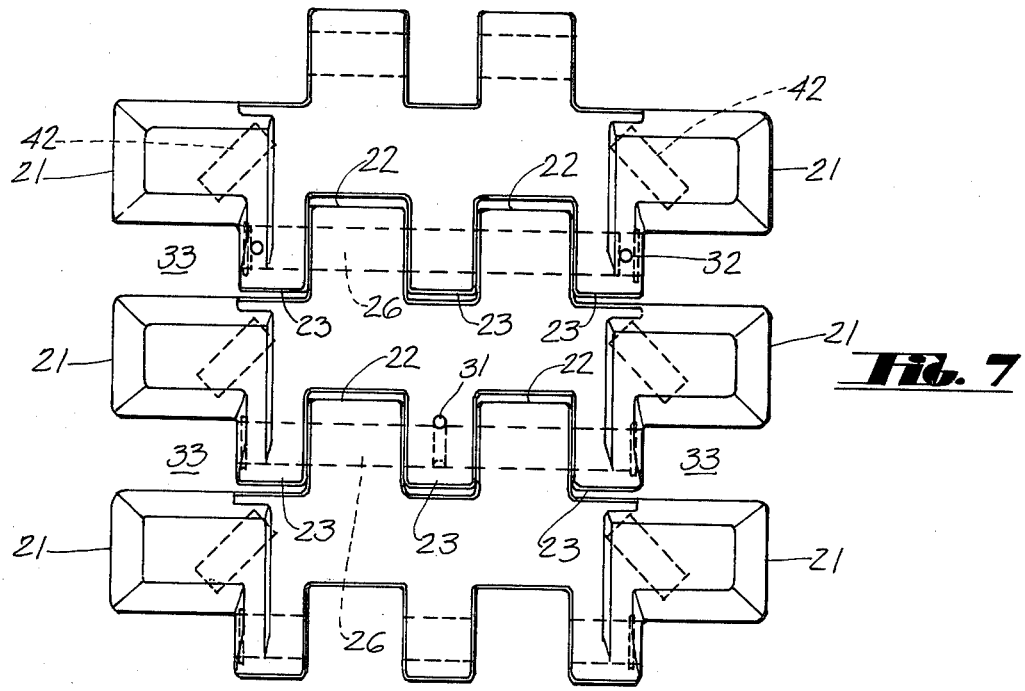
FIG. 7 is a top view of a plurality of the crawler pads of this invention in their interdigitated relationship but showing only a portion of the crawler tread, track or chain.

When a plurality of the crawler pads 20 are interdigitated and articulated so as to form an endless tread, portions of which are shown in FIGS. 1 and 7, a tread grouser is in effect comprised of a plurality of the aligned, interdigitated main grouser elements 22 and 23 of any two adjacent pads.

Various means may be employed to maintain the connecting pintle within the grouser elements 22 and 23 so as to provided the desired articulation. The pintle 26 of FIG. 9 is illustrated as having a groove 27 adjacent each end thereof and adapted to receive a spring clip 28. Corresponding grooves 29 may be provided within the grouser elements 23. It will be apparent, therefore, that when a pintle 26 is inserted through the aligned bores 24 and 25 of interdigitated main grouser elements 22 and 23 of adjacent crawler pads 20, the clips 28, located within the grooves 27 of the pintle 26, may initially be compressed to permit them to pass through the bores 24 and 25 and eventually snap into position within the grooves 29 whereby to properly locate and maintain the pintle 26.

Other arrangements may be used to hold the pintle or connecting pin 26 in position and some of these are illustrated. In FIG. 9 and FIG. 7 the pintle 26 has been illustrated as being provided with a groove 30 centrally thereof and adapted to be brought into alignment with a corresponding orifice in a main grouser element 23 so that a pin 31 may be driven through such orifice into the groove 30 whereby to maintain the pintle in place. Another manner in which the pintle 26 may be secured within properly interdigitated main grouser elements 22 and 23 is to provide orifices in the outer, main grouser elements 23 and to pass pins 32 through such orifices adjacent the ends of a shortened pintle 26 so as to limit axial movement thereof while permitting it to rotate. Combinations of these pintle retaining means may be utilized if desired. It will also be obvious to those skilled in the art that other ways of securing the pintle 26 may be employed.

Figure 6:
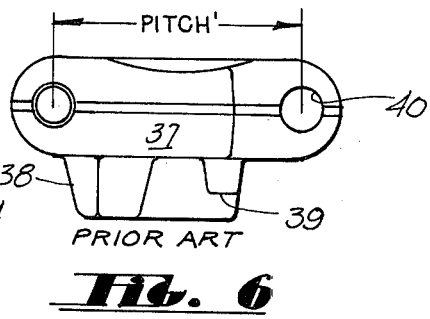
FIG. 6 is an end view of a typical prior art crawler pad of the type which the instant crawler pad is designed to replace.
Figure 8:
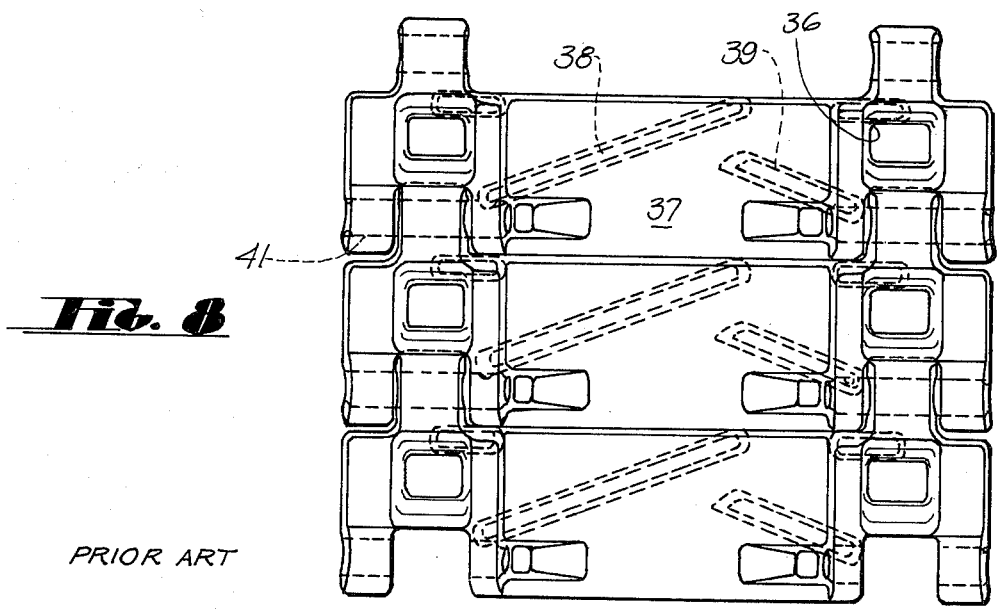
FIG. 8 is a top view of a plurality of the prior art crawler pads in their interdigitated relationship, also showing only a portion of the prior art crawler chain.

When the crawler pads 20 are assembled as illustrated in FIGS. 1 and 7, there are spaces defined by the ends 21 of adjacent pads and the main grouser elements 23, which spaces 33 receive the driving teeth 34 of a drive sprocket 35 (FIG. 10). These spaces 33 are open sideways of the tread made up of the interdigitated, articulated crawler pads 20. This arrangement is to be distinguished from such prior art as is depicted in FIGS. 6 and 8 wherein interior openings 36 are provided within the body of the pad to receive such teeth. In such prior art arrangements the main body of the pad is designated by the reference numeral 37 and the grouser elements by the reference numerals 38 and 39. These elements 38 and 39 are ground engaging ribs on the underside of the pad 37. Bores 40 are provided to receive retaining pintles 41 for connecting adjacent pads 37. At least two of the means 41 must be employed for connecting each pair of adjacent pads 37. In such prior art arrangement the grouser elements 38 and 39 are, in effect, located at the underside of the main body of the crawler pad 37.

In the arrangement of this invention the main grouser elements 22 and 23 are in actuality a part of the main body of the pad 20. The pintles are, therefore, located not only in the main body of the pad 20 but also in part at least in the grouser elements 22 and 23.

The effect of combining the main body of the pad 20 with the main grouser elements 22 and 23 is to provide more pad material around the pintle receiving orifices 24 and 25 while at the same time permitting the use of a larger diameter pintle. Additionally, a single, large pintle may be used to connect a properly aligned, interdigitated pair of adjacent crawler pads 20.

Figure 5:
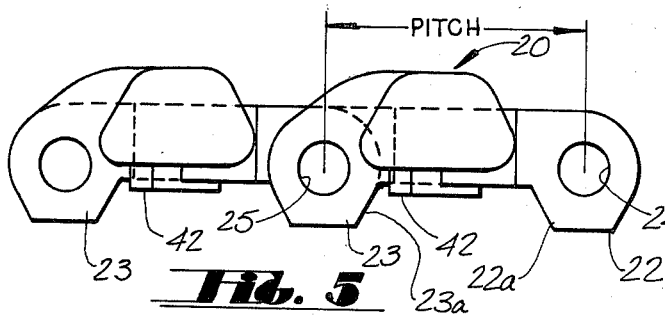
FIG. 5 is an end view of a pair of crawler pads in their interdigitated relationship.

As best seen in FIGS. 5 and 6, the overall thickness of the crawler pad 20 of the instant invention and the crawler pads 37 of the prior art are substantially the same. The pintle receiving orifices 24 and 25, however, are located closer to the ground (considered to be at the lowerside of these FIGURES) than are the orifices 40 of the prior art. Considering the center point of a drive sprocket as located somewhere above the respective pads 20 and 37 of these FIGS. 5 and 6, the fact that the orifices 24 and 25 are closer to the ground, and thus farther removed from such center point, as compared to the orifices 40, means that the pitch is greater; that is, the distance between the orifices 24 and 25 is greater than the distances between the orifices 40 which means that the crawler pad of the instant invention is wider, resulting in fewer pads to make-up a tread of the same length as a corresponding prior art tread, which also means that there are fewer points of articulation and thus fewer areas where failure and wear might occur.

By in effect locating the connecting pintles in part at least in the main grouser elements 22 and 23, which grouser elements are also in effect integral parts of the main body of the crawler pad itself, a much stronger tread is achieved. Such tread is comprised of relatively fewer crawler pads, fewer connecting pins or pintles are required because of the interdigitated relationship existing between the main grouser elements of adjacent pads, and those connecting pintles which are employed may be of large diameter, thus permitting them to be stronger, while at the same time those portions of the pads which receive these larger pintles are so arranged that there is increased pad material in the vicinity of the pintle receiving bores 24 and 25.

The laterally open, teeth receiving spaces 33 greatly facilitate the dispersment of any accumulated packing which might otherwise occur between the driving sprocket tooth 34 and the crawler pads 20 in a sideways direction. The sprocket teeth 34 will engage the ends 21 of the pads 20 as is best seen in FIG. 10.

Another feature of the invention in a preferred embodiment thereof is the "squaring off" of the ends 21 of the crawler pads 20 and of the main grouser elements 22 and 23 as well. The angularities thus obtained, as generally indicated at 21a, 22a and 23a achieves not only an improved ground engaging shape for the pads and tread comprised thereof, but also such angularities result in a change in the shape of the area spanned by adjacent pads 20 as they are moved around the sprocket 35. This aids in the breaking away of material accumulated in such areas and it also enables the main grouser elements 22 and 23 to gain a "perch" on material accumulated in such areas so as to shove such material free of the tread comprised of the interdigitated, articulated pads 20.

Figure 3:
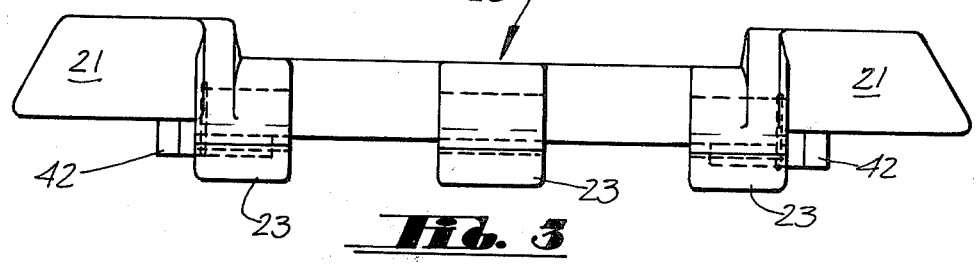
FIG. 3 is a front elevation of the crawler pad of FIG. 2.
Figure 4:
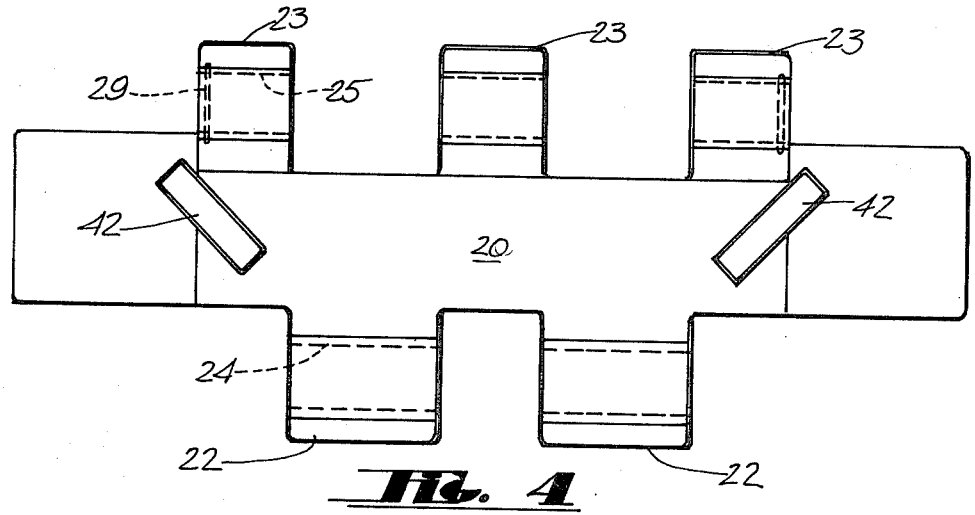
FIG. 4 is a bottom view of the crawler pad shown in FIGS. 2 and 3.

As best seen in FIGS. 3 and 4 supplemental grouser elements 42 may be employed. These may comprise relatively short, ground engaging ribs located on the bottom side of the central portion of the pad 20 between the ends 21 thereof. These supplemental grouser elements 42 may be located slantwise relative to the long axis of the pad 20 from one end 21 to the other.

Modifications of the crawler pad 20 are illustrated in FIGS. 11, 12 and 13. Two modifications are illustrated in FIG. 11. In that FIGURE the supplemental grousers 42 of, for example, FIG. 4 have been replaced by either a relatively long ground engaging rib 43 extending along or parallel with the long axis of the pad 20, or with a similar rib 44. It is contemplated that the embodiment which utilizes the rib 43 will be so arranged that the rib does not extend beyond the cavity defined by the main grouser elements 22 and 23, while in the other embodiment illustrated in FIG. 11 the ground engaging rib 44 will extend outside of such cavity.

In the embodiment of FIG. 12 all of the supplemental grousers 42, 43 and 44 have been eliminated, and so has the cavity existing between the main grousers 22 and 23 of the FIG. 5 embodiment. Thus, in FIG. 12, the crawler pad 20 has been made of substantially the same thickness throughout so that the cavity existing between the main grouser elements 22 and 23 of the FIG. 5 embodiment, for example, has been eliminated. This is illustrated by the reference numeral 45. This pad is that which would be used on surfaces when no penetration is desired.

The FIG. 13 embodiment is generally like that of FIG. 5 except that the "squaring off" of the pad elements 21, 22 and 23 has been eliminated. The main grouser elements 22 and 23 are thus provided with rounded contours as indicated at 22b and 23b. This pad is for use on surfaces where minimal penetration is desired.

In the various embodiments of these FIGS. 11, 12 and 13 the main grouser elements 22 and 23 have been retained so that the connecting pintles are, in all of the embodiments, located at least in part in the combined pad body and main grouser elements to retain the durable characteristics above described.

From the foregoing, therefore, as perhaps best seen in FIGS. 1, 7 and 10, it will readily be apparent that an endless ground engaging tread or track is achieved by interdigitating and articulating crawler pads having main grouser elements thereon, groups of these so interdigitated main grouser elements comprising tread grousers extending the width of the tread, such width being determined by the lengths of the crawler pads considered from one end 21 to the other. Each of the individual crawler pads may also be provided with supplemental grousers of various configurations. By in effect locating the connecting pintles for adjacent crawler pads in part at least within the main grouser elements of such pads, it is possible to provide a larger and stronger pintle than heretofore, additional crawler pad material may be employed in the vicinity of the pintle receiving bore, and the pitch (see FIG. 5) of the pad is greater with the result that fewer pads are needed for the same length tread as would be achieved by the prior art (see pitch' of FIG. 6) and there are fewer points of articulation and corresponding areas of possible difficulty.

The spaces 33 of FIG. 7 that are occupied by the sprocket teeth 34 of FIG. 10 are open ended and this greatly facilitates the dispersement of any accumulated packing between the sprocket teeth and the crawler pads in a sideways direction. In addition, by locating these spaces at the outer ends of the individual pads, the central portion of the pads, from end to end, is uninterrupted thus making for a stronger, easier to manufacture, individual crawler pad. The squared-off angularities applied to the modification illustrated in FIG. 10 result in the shape of the cavity defined by the main grouser elements 22 and 23 changing as the tread made up of such pads moves around the sprocket 35. This occurs as the squared-off portions of adjacent main grouser elements 22 and 23 come out of alignment with one another. This is to be distinguished, for example, from the arcuate areas 22b and 23b of the FIG. 13 modification wherein the shape of the cavity will remain substantially constant as the tread travels about the sprocket. The change in shape effected by the squared-off arrangement of FIG. 10 not only results in such angular portions being able to exert a shoving action on accumulated material but also the change in shape of the cavity in which such material accumulates, as just described, results in the material in such cavities being more readily dispersed and clogging of the tread thus lessened. The use of a single pintle to connect a pair of adjacent pads provides a greater bearing surface on such pintle within the interdigitated pads and shear forces on the pin are spread out and the effect thereof lessened.

By way of concluding summary, therefore, a crawler pad manufactured in accordance with the teachings of this invention comprises a solid, uninterrupted central portion extending throughout its length from one end to the other, an even number of spaced main grouser elements extending from one side of the central portion and at right angles thereto, an uneven number of spaced main grouser elements extending on the other side of the central portion and at right angles thereto, each of the grouser elements of even number being located opposite the space separating two of the grouser elements of uneven number, and each of the endmost grouser elements of uneven number being spaced from the end of the central portion nearest it a distance sufficient to define a space capable of being occupied by a sprocket tooth, all of said main grouser elements having pintle receiving bores therein that may be brought into alignment when two of the crawler pads are joined by inserting the even numbered elements in the spaces defined by pairs of the uneven numbered grouser elements, whereby a pintle may be inserted through the now aligned even and uneven main grouser elements. Other crawler pads are likewise interdigitated and articulated to make up an endless tread comprised of such pads. A tread grouser, therefore, may be considered as comprised of a plurality of the aligned, interdigitated main grouser elements of two adjacent pads, the succession of pads forming the tread being held in their articulated, interdigitated relationship by means of the pintles passing through the aligned even and uneven main grouser elements of adjacent crawler pads.

The blending of the solid central portion of the crawler pad with the even and uneven main grouser elements extending therefrom provides grouser elements which will accept a larger diameter pintle than has heretofore been able to be used while at the same time providing more crawler pad material in the region of the pintle receiving bores. By locating these bores closer to the ground, the pitch of the tread as shown in FIG. 5 is made greater than normal whereby a fewer number of pads will make up a tread of a given prior art length. The number of connecting pins or pintles is greatly reduced making for a stronger, easier to manufacture tread structure.

Supplemental grousers such as the the angular elements 42 of FIG. 4 may be utilized; longer supplemental grouser elements such as those indicated at 43 and 44 in FIG. 11 may also be employed, either along with or parallel to the long axis of the pad, or at a slant thereto. In some instances, as indicated in FIG. 12, the additional grouser elements may be replaced simply by completely filling the cavity which normally extends between the main grouser elements 22 and 23 of, for example, the pad of FIGS. 2 through 5. And although the crawler pads of FIG. 13 possess certain of the advantages of this invention, it is preferred that the grouser elements 22 and 23 be provided with the angularities indicated at 22a and 23a rather than with the mating curved surfaces 22b and 23b. Such angularities provide for changes in the nature of the cavities defined by cooperating pairs of main grouser elements 22 and 23 as the tread proceeds around the sprocket 35 and this makes it easier to dislodge material which might otherwise be compacted in such cavities; the angular surfaces 22a and 23a also more positively engage such material that might otherwise be compacted within such cavities and the relative movement of such angular surfaces as the tread proceeds around the sprocket serves to aid in shoving and dislodging the compacted material from such cavities. By arranging the main grouser elements so as to provide spaces at the ends of the crawler pads making up a tread, sprocket teeth may be received in such open ended spaces so as to further facilitate the dispersement of any accumulated packing between such teeth and the various pads in a sideways direction. This arrangement also enables the central portion of each pad to be uninterrupted by any sprocket receiving areas whereby to strengthen the pad and whereby to simplify its manufacture.

It will be apparent to those skilled in the art that further modifications may be made in the crawler pad and tread of this invention without departing from the scope and spirit thereof. It is to be understood that while the invention has been described in terms of certain particular structures and arrangements, the invention is not to be limited to such certain particular structures and arrangements except insofar as they are specifically set forth in the subjoined claims.

The embodiments of the invention in which an exclusive property or privilege is claimed are defined as follows:

1. An improved crawler pad for a crawler tread such as may be used on mining machines and the like, said crawler pad being comprised of an uninterrupted solid central portion extending from one end of said crawler pad to the other end thereof, the length of said crawler pad from end to end determining the width of a said tread; a first solid end portion at said one end, said first solid end portion constituting an integral continuation of said solid central portion, and a second solid end portion at said other end, said second solid end portion constituting an integral continuation of said solid central portion, and said first and said second solid end portions providing a pair of shoulders extending upwardly from said solid central portion; at least one first main grouser element extending from one side of said solid central portion at right angles thereto and spaced from both of said solid end portions; at least two second main grouser elements extending from an opposite side of said solid central portion and at right angles thereto, said second main grouser elements being spaced from one another such that said first main grouser element is opposite the space defined by said second main grouser elements, and one of said second main grouser elements being spaced from the said solid end portion which is nearest to said one of said second grouser elements whereby to define a tooth receiving space; all of said first and of said second main grouser elements being substantially co-extensive with said solid central portion, both of said second main grouser elements which are nearest their respective said solid end portions being provided with upstanding portions constituting a continuation of the said shoulders; pintle receiving bores in all of said grouser elements, said grouser elements being otherwise solid in the manner of said solid central portion and of said solid end portions; the said bores being so located in their respective main grouser elements that when, in making up a crawler tread, a first said main grouser element on one of said pads is located between the second main grouser elements on an adjacent said pad, the said pintle receiving bores of interdigitated grouser elements will be aligned so as to be capable of receiving a pintle to articulately join the interdigitated pads; the said tooth receiving space being open ended in a sideways direction from said one of said second main grouser elements along the length of said pad towards that said solid end portion which is nearest to the said one of said second main grouser elements, said tooth receiving space being beyond said grouser elements and outside of said shoulders and outside of said upstanding portions, and the said tooth receiving space being sufficient to permit the tooth of a drive sprocket to drivingly engage the said last mentioned solid end portion of said pad, whereby to provide a maximum bearing surface for a said tooth.

2. The pad of claim 1 in which there are two of said first main grouser elements spaced from one another; and in which there are three of said second main grouser elements.

3. The pad of 1 in which there are three of said first main grouser elements spaced from one another; and in which there are four of said second main grouser elements.

4. The pad of claim 1 in which there are four of said first main grouser elements spaced from one another; and in which there are five of said second main grouser elements.

5. The pad of claim 1 in which there are an even number of said first main grouser elements and an uneven number of said second main grouser elements, said uneven number of said second grouser elements outnumbering said even number of said first grouser elements by one.

* * * * *